(12) United States Patent
Wang et al.

(10) Patent No.: US 12,227,188 B2
(45) Date of Patent: Feb. 18, 2025

(54) DYNAMIC SLIP TARGET TRACTION CONTROL

(71) Applicant: Rivian IP Holdings, LLC, Plymouth, MI (US)

(72) Inventors: Shuyang Wang, Laguna Niguel, CA (US); Hien Nguyen, Tustin, CA (US); Vineet Mathew, Tustin, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 88 days.

(21) Appl. No.: 18/146,672

(22) Filed: Dec. 27, 2022

(65) Prior Publication Data

US 2024/0208506 A1    Jun. 27, 2024

(51) Int. Cl.
| | |
|---|---|
| *B60W 30/18* | (2012.01) |
| *B60W 10/08* | (2006.01) |
| *B60W 10/184* | (2012.01) |
| *B60W 30/02* | (2012.01) |
| *B60W 50/06* | (2006.01) |

(52) U.S. Cl.
CPC ...... *B60W 30/18172* (2013.01); *B60W 10/08* (2013.01); *B60W 30/02* (2013.01); *B60W 50/06* (2013.01); *B60W 10/184* (2013.01); *B60W 2510/083* (2013.01); *B60W 2510/20* (2013.01); *B60W 2520/14* (2013.01); *B60W 2520/26* (2013.01)

(58) Field of Classification Search
CPC ........... B60W 30/18172; B60W 10/08; B60W 30/02; B60W 50/06; B60W 10/184; B60W 2510/083; B60W 2510/20; B60W 2520/14; B60W 2520/26
See application file for complete search history.

(56) References Cited

U.S. PATENT DOCUMENTS

| | | | | |
|---|---|---|---|---|
| 5,508,924 | A * | 4/1996 | Yamashita | B60K 7/0007 701/91 |
| 5,555,499 | A * | 9/1996 | Yamashita | B60K 28/16 701/84 |
| 5,631,829 | A * | 5/1997 | Takasaki | B60K 23/0808 701/1 |
| 7,853,389 | B2 | 12/2010 | Luehrsen et al. | |
| 8,244,445 | B2 | 8/2012 | Luehrsen et al. | |
| 9,475,395 | B2 | 10/2016 | Beever et al. | |

(Continued)

OTHER PUBLICATIONS

Non-Final Office Action on U.S. Appl. No. 18/343,601 Dtd Aug. 7, 2023.

(Continued)

*Primary Examiner* — Phutthiwat Wongwian
*Assistant Examiner* — Susan E Scharpf
(74) *Attorney, Agent, or Firm* — Foley & Lardner LLP

(57) ABSTRACT

Systems and methods to automatically detect and respond to driving on a deformable surface are provided. A system can determine, for a first time interval, a difference between an expected acceleration of a vehicle and an actual acceleration of the vehicle measured via one or more sensors of the vehicle. The system can detect, for the first time interval, a condition for the vehicle to increase a first slip target set for the vehicle. The system can increase the first slip target set for the vehicle to a second slip target responsive to the difference greater than or equal to a threshold and the detection of the condition.

20 Claims, 6 Drawing Sheets

(56) References Cited

U.S. PATENT DOCUMENTS

| | | | |
|---|---|---|---|
| 9,493,160 B2 | 11/2016 | Kelly et al. | |
| 10,754,340 B1 | 8/2020 | Corbett et al. | |
| 11,281,223 B2 | 3/2022 | Corbett et al. | |
| 11,543,821 B2 | 1/2023 | Corbett et al. | |
| 2006/0199697 A1* | 9/2006 | Kirkwood | F16D 48/064 477/5 |
| 2007/0184929 A1 | 8/2007 | Piyabongkarn et al. | |
| 2009/0112437 A1 | 4/2009 | Luehrsen et al. | |
| 2016/0001698 A1 | 1/2016 | Hall et al. | |
| 2017/0174192 A1 | 6/2017 | Ying | |
| 2020/0290596 A1* | 9/2020 | Birch | B60W 10/02 |
| 2020/0406999 A1* | 12/2020 | Corbett | B62M 6/50 |
| 2020/0407013 A1 | 12/2020 | Corbett et al. | |
| 2020/0409370 A1 | 12/2020 | Corbett et al. | |
| 2020/0409381 A1 | 12/2020 | Corbett et al. | |
| 2021/0078581 A1 | 3/2021 | Velazquez Alcantar et al. | |
| 2022/0063672 A1 | 3/2022 | Corbett et al. | |
| 2022/0063758 A1 | 3/2022 | Corbett et al. | |
| 2022/0066448 A1 | 3/2022 | Corbett et al. | |
| 2022/0155787 A1 | 5/2022 | Corbett et al. | |
| 2022/0219775 A1 | 7/2022 | Corbett et al. | |
| 2022/0219776 A1 | 7/2022 | Corbett et al. | |
| 2022/0219777 A1 | 7/2022 | Corbett et al. | |
| 2022/0219778 A1 | 7/2022 | Corbett et al. | |
| 2022/0227376 A1 | 7/2022 | Corbett et al. | |
| 2022/0227455 A1 | 7/2022 | Corbett et al. | |

OTHER PUBLICATIONS

Non-Final Office Action on U.S. Appl. No. 18/343,601 dated Feb. 1, 2024.

Final Office Action on U.S. Appl. No. 18/343,601 dated Aug. 23, 2024.

* cited by examiner

DYNAMIC SLIP TARGET TRACTION CONTROL

INTRODUCTION

Vehicles drive on various types of surfaces, including paved road surfaces or unpaved off-road surfaces. Certain characteristics of certain surfaces can pose challenges to vehicles.

SUMMARY

This technical solution is generally directed to automatically detecting and responding to driving on a loose, deformable surface during traction control. To improve vehicle control and driving on loose, deformable surfaces, this technology can detect vehicle attributes through various sensors (e.g., vehicle acceleration, wheel acceleration, motor torque, motor speed, vehicle speed, steering angle, or yaw rate). The technology can determine whether some or all of the following conditions are true: 1) Is the vehicle accelerating more than a predetermined threshold? 2) Is the wheel slip greater than a predetermined threshold? 3) Is the traction control enabled and currently active? 4) Does the motor torque exceed a predetermined threshold? 5) Is the cross-axle torque below a predetermined threshold? 6) Is the wheel slip error below a predetermined threshold? 7) Does the difference between the expected acceleration and the actual acceleration exceed a predetermined threshold?

If some or all of these conditions are true, then the technology can increase the slip target, which can allow the motor torque to increase. Thus, this technology can automatically detect driving on a loose, deformable surface using various conditions and without any manual input, and then automatically increase the slip target to a deformable slip target to improve acceleration, control, or driving on loose, deformable surfaces.

At least one aspect is directed to a system. The system can include one or more processors coupled with memory. The one or more processors can determine, for a first time interval, a difference between an expected acceleration of a vehicle and an actual acceleration of the vehicle measured via one or more sensors of the vehicle. The one or more processors and memory can detect, for the first time interval, a condition for the vehicle to increase a first slip target set for the vehicle. The one or more processors and memory can increase the first slip target set for the vehicle to a second slip target responsive to the difference greater than or equal to a threshold and the detection of the condition.

At least one aspect is directed to a method. The method can be performed by one or more processors coupled with memory of a vehicle. The method can include the one or more processors determining, for a first time interval, a difference between an expected acceleration of the vehicle and an actual acceleration of the vehicle measured via one or more sensors of the vehicle. The method can include the one or more processors detecting, for the first time interval, a condition for the vehicle to increase a first slip target set for the vehicle. The method can include the one or more processors increasing the first slip target set for the vehicle to a second slip target responsive to the difference greater than or equal to a threshold and the detection of the condition.

At least one aspect is directed to a vehicle. The vehicle can include a plurality of wheels. The vehicle can include one or more motors configured to rotate the plurality of wheels. The vehicle can include one or more processors coupled with memory. The one or more processors can determine, for a first time interval, a difference between an expected acceleration of the vehicle and an actual acceleration of the vehicle measured via one or more sensors of the vehicle. The one or more processors can detect, for the first time interval, a condition for the vehicle to increase a first slip target set for the vehicle. The one or more processors can increase the first slip target set for the vehicle to a second slip target responsive to the difference greater than or equal to a threshold and the detection of the condition.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
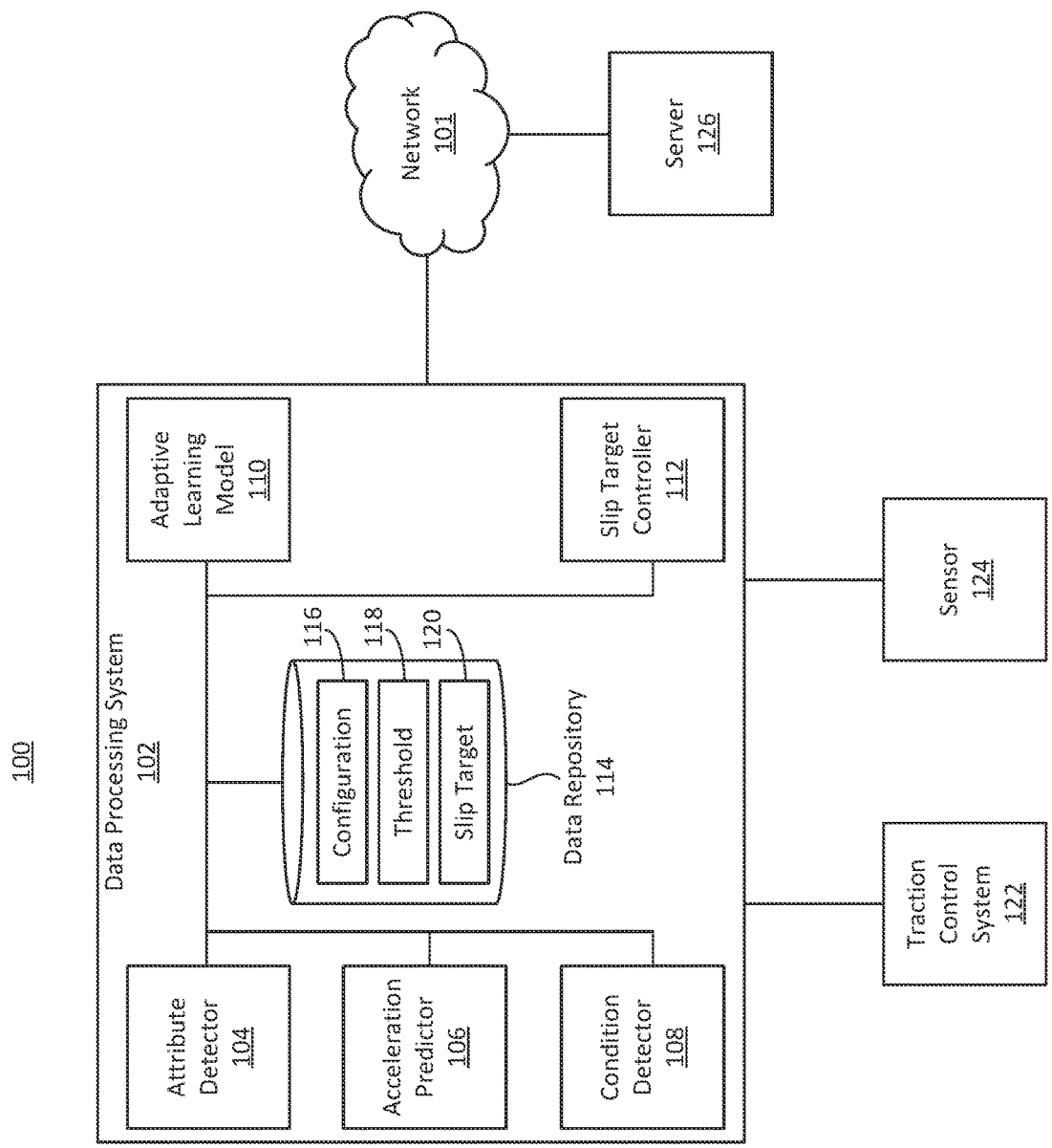
FIG. 1 depicts an example system to detect and respond to driving on a deformable surface.

Following below are more detailed descriptions of various concepts related to, and implementations of, methods, apparatuses, and systems of detecting and responding to driving on a deformable surface. The various concepts introduced above and discussed in greater detail below may be implemented in any of numerous ways.

This disclosure is directed to systems, methods and apparatuses to automatically detect and respond to driving on a loose, deformable surface during traction control. When a vehicle is driving on a surface, the traction control system may activate in order to prevent or minimize loss of traction (e.g., wheel spin). For example, the traction control system of a vehicle can determine the amount of wheel slip when the vehicle is driving on a surface. Wheel slip can refer to the relative motion between a wheel and the surface the wheel is moving on. The slip can be generated by the rotational speed of the wheel being greater than a free-rolling speed (or vehicle speed). For example, the traction control system can determine a value of slip for a wheel of the vehicle using the following function: slip_value=-(vehicle_speed-wheel_radius*wheel_rotation_speed)/vehicle_speed. Thus, if the vehicle_speed is less than the wheel_radius*wheel_rotation_speed for a wheel of the vehicle, then the slip_value can be a positive value. The traction control system can determine the slip value of a wheel of the vehicle, and compare the slip value with a slip target. If the slip value for a wheel is greater than or equal to a slip target for the wheel, then the traction control system can become active or engaged to actively reduce the value of slip of the wheel to below the slip target. For example, the traction control system can activate to apply a braking force to the wheel that has a slip value that is greater than or equal to the slip target in order to reduce the rotation speed of the wheel.

However, when driving on loose or deformable surfaces, the vehicle may lose acceleration if the slip target used by the traction control system is too low. For example, the slip target set for the traction control may be suitable to control slip on surfaces that is not loose or deformable (e.g., ice), but using this same slip target on a loose, deformable off-road surfaces (e.g., sand) may result in the vehicle losing acceleration.

To improve vehicle control and driving on loose, deformable surfaces, this technology can automatically detect vehicle attributes through various sensors (e.g., vehicle acceleration, wheel acceleration, motor torque, motor speed, vehicle speed, steering angle, or yaw rate). The technology can, based on the automatically detected vehicle attributes, determine whether to adjust the slip target to improve vehicle control on a loose, deformable surface. That is, without the driver of the vehicle having to change a setting to off-road mode, or the vehicle using static configuration information, this technical solution can obtain real-time sensor data to determine attributes of the vehicle, analyze the attributes to determine whether one or more conditions are present, and then dynamically adjust the slip target (e.g., increase the slip target) when the vehicle is driving on a loose, deformable surface to improve vehicle control.

For example, the technology can determine whether some or all of the following conditions are true: 1) Is the vehicle accelerating more than a predetermined threshold? 2) Is the wheel slip greater than a predetermined threshold? 3) Is the traction control enabled and currently active? 4) Does the motor torque exceed a predetermined threshold? 5) Is the cross-axle torque below a predetermined threshold? 6) Is the wheel slip error below a predetermined threshold? 7) Does the difference between the expected acceleration and the actual acceleration exceed a predetermined threshold? If some or all of these conditions are true, then the technology can increase the slip target, which can allow the motor torque to increase. Thus, this technology can automatically detect driving on a loose, deformable surface using various conditions and without any manual input, and then automatically increase the slip target to a deformable slip target to improve acceleration, control, or driving on loose, deformable surfaces.

FIG. 1 depicts an example system 100 to detect and respond to driving on a deformable surface. The system 100 can include a data processing system 102. The data processing system 102 can be hosted on, or a part of, a vehicle, such as vehicle 505 illustrated in FIG. 5. The data processing system 102 can include an attribute detector 104 to identify one or more attributes associated with the vehicle 505, such as driving attributes of the vehicle 505. The data processing system 102 can include at least one acceleration predictor 106 to predict, estimate, or determine an expected acceleration of the vehicle 505 based on, for example, an amount of motor torque and weight of the vehicle 505. The data processing system 102 can include at least one condition detector 108 to determine, based on the attributes, whether one or more conditions are present for the vehicle 505, such as whether the driver is accelerating the vehicle, whether there is wheel slip, whether the traction control is active, whether the motor torque is greater than or equal to a motor torque threshold, whether the cross-axle torque is less than or equal to a cross-axle torque threshold, or whether the wheel slip error is below a wheel slip error threshold. The data processing system 102 can include at least one adaptive learning component 110 to facilitate predicting or estimating the expected acceleration of the vehicle 505 based on the motor torque and weight of the vehicle. The data processing system 102 can include at least one slip target controller 112 to increase or decrease the slip target used by the traction control system 128 to provide traction control.

The attribute detector 104, acceleration predictor 106, condition detector 108, adaptive learning component 110, or slip target controller 112 can each communicate with the data repository 114 or database. The data repository 114 can include one or more data files, data structures, arrays, values, or other information that facilitates operation of the data processing system 102. The data repository 114 can include one or more local or distributed databases, and can include a database management system. The data repository 114 can include, maintain, or manage a configuration 116 data structure for the vehicle. The configuration 116 can include a model of the vehicle, features of the vehicle, weight of the vehicle, wheel characteristics of the vehicle, horsepower or torque capabilities of the vehicle, battery capacity of the vehicle, manufacturing specification for the vehicle, or other information that can facilitate detecting and responding to driving on a deformable surface.

The data repository 114 can include, maintain, or manage a threshold 118 data structure for the vehicle. The threshold 118 data structure can include thresholds used by one or more component of the system 100 to facilitate detecting and responding to driving on a deformable surface, such as thresholds to detect whether a driving is accelerating the vehicle, whether there is wheel slip, a motor torque threshold, a cross-axle torque threshold, a wheel slip error threshold, or threshold for a difference between the actual and expected acceleration of the vehicle. The thresholds 118 can be static, or the data processing system 102 can update one or more threshold 118 or receive an update to a thresholds 118 from server 126, for example.

The data repository 114 can include, maintain, or manage a slip target 120 data structure for the vehicle. The slip target 120 can be maintained, used by, or updated by the slip target controller 112. The slip target 120 can refer to or include a maximum amount of slip that is allowed before the traction control system 128 becomes active and attempts to reduce the amount of slip. The slip target 120 data structure can include predetermined slip targets 120 to be used by the slip target controller 112 to adjust the slip target used by the traction control system 128. The slip target 120 data structure can include a slip target increment.

The data repository 114 can include, maintain, or manage a model 122 data structure for the vehicle. The model 122 can include any type of model designed, configured or trained to predict, estimate, or otherwise determine or identify an expected acceleration of a vehicle based on an input, such as a current motor torque, weight of the vehicle, or other environmental variables. The model 122 can be based on a function established and configured for the vehicle. The model 122 can be a machine learning model that is trained based on a machine learning technique. The model 122 can be trained, updated, or otherwise maintain by the adaptive learning component 110.

The attribute detector 104, acceleration predictor 106, condition detector 108, adaptive learning component 110, or slip target controller 112 can each include at least one processing unit or other logic device such as programmable logic array engine, or module configured to communicate with the data repository 114 or database. The attribute detector 104, acceleration predictor 106, condition detector 108, adaptive learning component 110, or slip target controller 112 can be separate components, a single component, or part of the data processing system 102. The system 100 and its components, such as a data processing system 102, can include hardware elements, such as one or more processors, logic devices, or circuits.

The data processing system 102 can interface with, communicate with, or otherwise receive or provide information with one or more of the traction control system 128, sensor 124 or server 126 via a network 101. The data processing system 102, traction control system 128, sensor 124 or server 126 can each include at least one logic device such as a computing device having a processor to communicate via the network 101. The data processing system 102 can include at least one computation resource, server, processor or memory. For example, the data processing system 102 can include a plurality of computation resources or processors.

The network 101 can include computer networks such as the Internet, local, wide, metro, or other area networks, intranets, satellite networks, and other communication networks such as voice or data mobile telephone networks. The network 101 can include wired or wireless networks, connections, or communication channels. The network 101 can be used to transmit or receive information or commands to or from various components or sources. For example, the sensor 124 or traction control system 128 can be hardwired or connected to the data processing system 102 via a physical wire or cable via a communication port. The network 101 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network.

The vehicle (e.g., vehicle 505) can include one or more sensors 124. The vehicle can include various types of sensors 124, including, for example, an accelerometer, inertial measurement unit ("IMU"), wheel speed sensors, motor torque sensor, cross-axle torque sensor, speedometer, yaw rate sensor, or global positioning system sensor.

The traction control system 128 can include can be designed, constructed, and operational to prevent or reduce loss of traction (e.g., wheelspin) of the driven road wheels of the vehicle. The traction control system 128 can be activated when throttle input and motor power and torque transfer are mismatched to the road surface conditions. The traction control system 128 can perform one or more functions to prevent or reduce loss of traction, including, for example: 1) applying brake force to one or more wheels; or 2) reduce or suppress motor torque or power output.

When the traction control system 128 detects one or more driven wheels spinning faster than another by a predetermine amount, the traction control system 128 can invoke a brake mechanism, such as anti-lock braking system or a regenerative brake, to apply brake friction to wheels spinning with lessened traction. Braking action on slipping wheel(s) can cause power transfer to wheel axle(s) with traction due to the mechanical action within the differential.

The traction control system 128 can include or utilize sensors 124. For example, each wheel of the vehicle 505 can be equipped with a sensor 124 that senses changes in the speed of the wheel due to loss of traction. The traction control system 128, or other system or control unit of the vehicle 505, can process the wheel speed information from the wheels and initiate braking to the wheels that have less traction.

The server 126 can be part of or include a cloud computing environment. The server 126 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

The server 126 can be remote from the data processing system 102 or the vehicle. The server 126 can maintain one or more thresholds, values, instructions or models used by the data processing system 102 to automatically detect and respond to driving on a deformable surface. The server 126 can, for example, provide a baseline model used by the acceleration predictor 106 to determine the expected acceleration of the vehicle. The model provided by the server 126 can be maintained or updated by the server 126 based on receiving updated data, or other techniques. In some cases, the data processing system 102 (e.g., adaptive learning model 110) can update the model received from the server 126. In some cases, the server 126 can provide a baseline slip target 120 to the data processing system, a slip increment for the slip target controller 112 to use to increment the slip target, conditions used by the condition detector 108 or other configuration 116 information.

The data processing system 102 can include an attribute detector 104 designed, configured and operational to detect, receive, measure, generate, obtain or otherwise identify one or more attributes associated with, or used for, detecting and responding to driving on a deformable surface. The attributes can include, for example, the acceleration of the vehicle, the speed of the vehicle, the acceleration of a wheel of the vehicle, a torque of a motor of the vehicle, a speed of the motor of the vehicle, the steering angle, the yaw rate, wheel slip, or a cross-axle torque, for example. To detect or identify the attributes, the attribute detector 104 can receive data from one or more sensors 124 of the vehicle. The attribute detector 104 can communicate with the one or more sensors 124 to receive information about the attributes of the vehicle. The attribute detector 104 can receive attribute information based on a predetermined time interval or frequency. For example, the attribute detector 104 can obtain attribute information based on a sample rate, such as 1 millisecond, 2 milliseconds, 5 milliseconds, 10 milliseconds, 15 milliseconds, 20 milliseconds, 30 milliseconds, 50 milliseconds, or other time interval that facilitates detecting and responding to driving on a deformable surface.

The data received from the one sensors 124 can be synchronized to a same clock or counter such that the samples are synchronized to one another. The samples received from the sensors 124 can have a timestamp that corresponds to the timestamps of samples received from other sensors 124. For example, a first sample received from an acceleration sensor of the vehicle can provide a value of the acceleration for the vehicle at a first timestamp. A second sample received from a wheel acceleration sensor can provide a value for the acceleration of the wheel (e.g., an angular acceleration of the wheel) at the same first timestamp. In some cases, the attribute detector 104 can group samples that at a same timestamp. In some cases, the attribute detector 104 can group samples together that are within a time window of a time stamp, such as a time window that corresponds to a sample period or a multiple of the sample period (e.g., 2 times the sample period, or 3 times the sample period). For example, the attribute detector 104 can determine an attribute or one or more different attributes for the vehicle during a time interval, such as a first time interval and a second time interval that is subsequent to (or after) the first time interval. The second time interval can be adjacent to the first time interval, or at some time later than the first time interval.

In some cases, the attribute detector 104 can receive a time series of samples from the one or more sensors 124. The attribute detector 104 can apply a pre-processing technique to the time series of samples in order to improve the quality of the data that is used to generate attributes and determine one or more conditions of the vehicle. For example, the data may contain noise, erroneous values, null values, outliers, or other undesired data properties that may impact downstream processing by the data processing system 102. To improve the performance of any downstream processing by the data processing system 102, and thereby improve the performance with which the data processing system 102 can detect and respond to driving on a deformable surface, the attribute detector 104 of this technical solution can apply a filter to the samples received from the one or more sensors 124 in order to remove undesired data samples.

For example, the attribute detector 104 can apply a signal processing filter with a frequency response that is relatively flat in the passband. The signal processing filter can be, for example, a Butterworth-type filter. The signal processing filter can be referred to as a maximally flat magnitude filter. The signal processing filter can be designed, constructed and operational to reject unwanted frequencies, while having uniform sensitivity to the wanted frequencies. Thus, the signal processing filter can remove noise from the samples. The attribute detector 104 can apply other pre-processing data quality checks, such as checking if samples have values within a predetermined range, and removing samples or modifying samples that have values that fall outside a predetermined range.

The attribute detector 104 can determine an acceleration attribute from an acceleration sensor, for example. The acceleration sensor can include an accelerometer or an IMU. The acceleration attribute can correspond to the acceleration of the vehicle. The acceleration of the vehicle can be a vector, or can be a component of acceleration in a direction. For example, the acceleration can be the component of acceleration along an axis that extends from the back of the vehicle to the front of the vehicle; a component that extends laterally from the sides of the vehicle; or a component that extends along the direction of movement of the vehicle.

The attribute detector 104 can determine the speed of the vehicle based on the acceleration of the vehicle. The attribute detector 104 can determine the speed of the vehicle by integrating the acceleration to determine the velocity. If the velocity is a vector, the attribute detector 104 can determine the speed of the vehicle by taking the magnitude of the velocity, or taking the magnitude of the velocity in a particular direction.

The attribute detector 104 can determine the acceleration of a wheel of the vehicle using a wheel sensor. The wheel sensor can measure rotations of the wheel. The wheel sensor can measure angular acceleration of each wheel of the vehicle, or angular velocity of each wheel of the vehicle, or wheel speed. The wheel speed can base based on the rate of rotation of the wheel and the circumference of the wheel. For example, if rate of rotation is 5 rotations of the wheel per second, and the wheel has a 20 inch diameter, then the wheel speed in terms of inches per second can be approximately 314 inches per second.

The attribute detector 104 can determine the torque of the motor using a torque sensor associated with the motor. The motor can be an electric motor, in which case the torque of the motor can be based on the electrical power input, such as the voltage and current in the power line driving the motor. The attribute detector 104 can measure or determine the speed of the motor of the vehicle using one or more sensors associated with the electric motor, or based on other measurements associated with the electric motor. For the speed of the electric motor can refer to the rotations per minute of the electric motor, and can be determined based on the frequency of the electric motor.

The attribute detector 104 can determine the steering angle, which can refer to the angle at which the steering wheel is rotated. The attribute detector 104 can determine the steering angle using a steering wheel sensor, for example. The attribute detector 104 can determine a yaw rate of the vehicle using one or more sensors, such as gyroscope or IMU of the vehicle.

The attribute detector 104 can determine a wheel slip for each wheel of the vehicle. The attribute detector 104 can determine the wheel slip in a direction of rotation of the wheel based on a difference between the wheel speed (e.g., in miles per hour) and the vehicle speed (e.g., in miles per hour) in the same direction. The wheel slip can be a percentage that is based on the difference between the wheel speed and the vehicle speed divided by the vehicle speed. In some cases, the wheel slip can be based on the following function: slip_value=–(vehicle_speed–wheel_radius*wheel_rotation_speed)/vehicle_speed. Thus, if the vehicle_speed is less than the wheel_radius*wheel_rotation_speed for a wheel of the vehicle, then the slip_value can be a positive value.

The attribute detector 104 can determine a cross-axle torque for the vehicle. A cross-axle torque can refer to a difference in torque between a left wheel on the left side of the vehicle and a right wheel on the right side of the vehicle and on the same axis. If the torque is greater on one side of the vehicle versus the other side of the vehicle, then the vehicle may be turning, such as turning around a corner. The cross-axle torque value can indicate a percentage or the difference in torque between one side of the axle and the other side of the axle. The cross-axle torque value can be an absolute number based on the difference between the torque on each side of the axle.

The data processing system 102 can include an acceleration predictor 106 designed, constructed and operational to predict an expected acceleration. The expected acceleration can refer to the acceleration of the vehicle that is expected based on a function or model if the vehicle is driving on a non-deformable surface under ideal or default circumstances or conditions. For example, the expected acceleration can refer to the acceleration of the vehicle that is expected when a certain amount of motor torque is applied when the vehicle is driving on a paved highway or a paved road that is dry and free from debris. The expected acceleration can correspond to driving on a surface with a coefficient of friction that is greater than a threshold. For example, the coefficient of friction for a dry road or dry highway can be 0.7. Thus, the expected acceleration can refer to the acceleration of the vehicle that is expected when the vehicle is driving on a surface having a coefficient of friction that is equal to or greater than approximately (e.g., plus or minus 10%) 0.7, for example.

The expected acceleration can be greater than the actual acceleration of the vehicle when the vehicle is driving on a surface that is more deformable or has less friction than a dry, paved highway or road. For example, the expected acceleration of the vehicle can be greater than the actual acceleration of the vehicle when the vehicle is driving on a deformable surface such as sand, dirt or mud. A deformable surface can refer to a surface that changes shape due to the application of force, such as the force from the wheels of the vehicle being on contact with the surface or rotating on the surface. A first surface can be referred to as deformable if it changes shape responsive to a certain amount force, while a second surface may be referred to as non-deformable or not deformable if the second surface does not change shape responsive to the same amount of force. For example, a vehicle 505 driving on a sand by a beach can cause the sand to deform, while the vehicle 505 driving on a paved highway or road may not cause the paved highway or road to deform. Therefore, the sand can be referred to as a deformable surface, whereas the paved highway or road may be referred to as a non-deformable surface.

The acceleration predictor 106 can use a function or model to determine, predict, estimate, compute or otherwise identify the expected acceleration of the vehicle (e.g., predict what the acceleration of the vehicle would be on a non-deformable, dry surface). The acceleration predictor 106 can predict the expected acceleration using a function based on the amount of motor torque being generated and the mass of the car. For example, the expected acceleration can be based on the following function: expected_acceleration=force/mass. The force can be based on the motor torque, which can be based on the electric power being delivered to the motors of the vehicle. The mass can refer to the mass of the vehicle. The mass of the vehicle can be a preconfigured or predetermined amount. The mass of the vehicle can be a default mass. In some cases, the system can update the mass of the vehicle. For example, the mass of the vehicle can increase or decrease based on the number of passengers in the vehicle or cargo of the vehicle.

The data processing system 102 can use a static model (or function) or a dynamic model to determine the expected acceleration. The data processing system 102 can determine, via a model, the expected acceleration for the vehicle responsive to an amount of force applied via a motor of the vehicle. The static model or function can refer to using the function: expected_acceleration=force/mass. The value for mass can be a default mass of the vehicle, or the vehicle 505 can include one or more weight sensors from which the mass of the vehicle 505 can be calculated. The force can be based on the torque applied by the motor, which can be based on an input power to an electric motor, for example. When driving on a non-deformable surface, the drive torque being applied by the motor of the vehicle can go towards accelerating the vehicle. For example, when driving on a non-deformable surface, all or substantially all (e.g., 90%) of the drive torque being applied by the motor can go towards accelerating the vehicle. However, when driving on a deformable surface, less than all the drive torque is used to accelerate the vehicle as compared to when driving on the non-deformable surface.

In some cases, the data processing system 102 can use an adaptive learning model 110 designed, configured and operational to update a model used to predict or determine an expected acceleration of the vehicle 505. For example, the expected acceleration can refer to the acceleration for the vehicle 505 that is expected for a given motor torque on a dry, deformable surface. However, due to various characteristics associated with the vehicle (e.g., amount of drag force on the vehicle or inertia of vehicle), configuration of the vehicle, or the age of the vehicle or number of miles driven by the vehicle, the amount of acceleration realized by the vehicle 505 on a dry, deformable surface may vary. Thus, the adaptive learning model 110 can update a model used to determine the expected acceleration.

To do so, the adaptive learning model 110 can detect whether the vehicle 505 is driving on a deformable surface. The adaptive learning model 110 can detect whether the vehicle 505 is driving on a deformable surface under desired or ideal conditions that correspond to establishing an expected acceleration. The adaptive learning model 110 can determine whether the conditions have been met in order to collect data used to update a model used to determine to the expected acceleration. The conditions can include, for example, one or more of: 1) the vehicle 505 is driving on a non-deformable surface (e.g., paved highway or road), 2) the actual acceleration of the vehicle is less than a threshold, 3) the speed of the vehicle is less than a threshold, 4) the incline of the road is less than a threshold, 5) the tire pressure is within a desired range, 6) the traction control is inactive, 7) the weight or mass of the vehicle is less than a threshold, or 8) slip is less than a threshold. In some cases, the adaptive learning model can determine whether all of the conditions are met, or whether some of the condition are met. For example, the adaptive learning model 110 can determine to initiate updating the model if: 1) the traction control is inactive, 2) the vehicle is driving on a non-deformable surface, and 3) the cross-axle torque is below a predetermined threshold.

Upon determining that the conditions for activating adapting learning, the data processing system 102 can collect data on the actual acceleration of the vehicle responsive to measured or sensed motor torque via one or more sensors 124. For example, the data processing system 102 can detect, during a second time interval, that the condition for the vehicle is not present and a speed of the vehicle is greater than a second threshold. The data processing system 102 can determine, responsive to the detection that the condition for the vehicle is not present and the speed of the vehicle is greater than second threshold, to update the model via the adaptive learning model 110. The data processing system 102 (e.g., via attribute detector 104) can obtain information about the motor torque being applied and the actual acceleration of the vehicle. The data processing system 102 can further obtain information about the inclination of the road or weight of the vehicle including passenger and cargo weight, for example. The adaptive learning model 110 can use the collected data to predict or estimate what the expected acceleration of the vehicle is based on a given motor torque or other input attributes.

The adaptive learning model 110 can learn characteristics that impact the acceleration, such as mass of the vehicle or drag friction losses. The adaptive learning model 110 can provide an expected acceleration based on different wind speeds or drag forces. For example, the faster the vehicle is driving, the greater the drag force on the vehicle due to wind speed. Accordingly, the expected acceleration for a given motor torque may be greater at low wind speeds (e.g., when traveling 10 miles per hour) as compared to higher wind speeds (e.g., when the vehicle is traveling at 55 miles per hour).

The adaptive learning model 110 can update a default or initially static model with the collected data. The adaptive learning model 110 can use any adaptive learning technique to update the model. In some cases, the adaptive learning model 110 can fit a curve to the collected data. For example, the adaptive learning model 110 can measure the actual acceleration and the motor torque or force being applied to the vehicle during the data collection or training phase. The adaptive learning model 110 can then fit a curve or generate a function or model that can be used to subsequently predict an expected acceleration based on an input torque or force. In some cases, the data processing system 102 can use machine learning to generate or update a model used to determine the expected acceleration responsive to torque or force. Responsive to updating the model, the data processing system 102 (e.g., via acceleration predictor 106) can determine the expected acceleration for the vehicle via the model updated via the adaptive learning technique.

The data processing system 102 can include a condition detector 108 designed, configured and operational to detect a condition. The condition can indicate to increase a slip target set for the vehicle. The condition can correspond to detecting that the vehicle is driving on a deformable surface. The condition detector 108 can detect multiple conditions are present in order to determine to increase the slip target. The slip target can be used by a traction control system 122 to increase traction or keep the wheel slip to within the slip target set by the data processing system 102. The condition detector 108 can determine the conditions during, within, or for a time interval. The condition detector 108 can determine a value for each condition during a time interval. The condition detector 108 can determine the values for each condition for each of several time intervals. The value can be a binary value, such as 0 or 1, yes or no, pass or fail, satisfied or not satisfied.

For example, a first condition can include whether the driver is accelerating. The condition detector 108 can detect whether the driver or user of the vehicle is actuating or otherwise causing or attempting to cause the vehicle to accelerate. The condition detector 108 can detect the amount or level of actuation or attempted acceleration of the vehicle. The condition detector 108 can compare the detected amount of acceleration with a threshold (e.g., an acceleration threshold stored in threshold 118 data structure) to determine whether the driver of the vehicle is accelerating or pressing on the accelerator or otherwise instructing the vehicle to accelerate (e.g., via a button, user interface, or autonomous system). If the driver (or autonomous system) of the vehicle is accelerating (or attempting to accelerate) the vehicle, the condition detector 108 can determine the first condition is satisfied, met, a "yes", or otherwise indicates to increase the slip target. Thus, if the driver is pressing the accelerator by an amount greater than a threshold (e.g., greater than or equal to 1% actuation, 2% actuation, 5% actuation, or 10% actuation or other percentage that facilitates detecting and responding to driving on deformable surfaces), the condition detector 108 can determine that the value of the first condition is met, satisfied, or is present.

A second condition can include whether there is wheel slip. The condition detector 108 can determine there is wheel slip if the amount of wheel slip is greater than a wheel slip threshold or other predetermined threshold during a first time interval. The condition detector 108 can determine whether there is wheel slip based on information or data obtained by one or more sensors 124 or the attribute detector 104. Wheel slip can refer to the difference between the wheel speed (e.g., based on the angular speed or rate of rotation of the wheel) and the speed or velocity of the vehicle. Wheel slip can refer to the relative motion between a wheel and the surface the wheel is moving on. The slip can be generated by the rotational speed of the wheel being greater than a free-rolling speed (or vehicle speed). For example, the traction control system can determine a value of slip (or slip value or wheel slip) for a wheel of the vehicle using the following function: slip_value=-(vehicle_speed-wheel_radius*wheel_rotation_speed)/vehicle_speed. Thus, if the vehicle_speed is less than the wheel_radius*wheel_rotation_speed for a wheel of the vehicle, then the slip_value can be a positive value. The data processing system 102 (or condition detector 108) can determine the slip value of a wheel of the vehicle. The condition detector 108 can determine the wheel slip in a direction corresponding to the rotation of the wheel. The condition detector 108 can determine the wheel slip in a direction that is perpendicular to an axle of the vehicle. The condition detector 108 can determine the wheel slip in a direction that corresponds to the direction of movement of the vehicle.

The condition detector 108 can compare the slip value determined for a wheel with a predetermined slip threshold (e.g., a slip threshold stored in threshold 118 data structure). If the slip value is greater than or equal to the predetermined threshold, then the condition detector 108 can determine that wheel slip condition is met, satisfied, present, or is present. For example, if the slip value is determined as a percentage, then the condition detector 108 can determine that this condition is met if the slip value is greater than 1%, 2%, 3%, 5%, 7%, 10% or other predetermined wheel slip percentage that facilitates detecting and responding to driving on deformable surfaces.

A third condition can include whether the traction control system 122 is enabled and currently active during the first time interval. The traction control system 122 may be enabled or turned on by default when the vehicle is started or begins driving. The traction control system 122 may be enabled or turned on by the user. However, the traction control system 122 may only be active (e.g., actively applying braking force or otherwise reducing the rotation rate of a wheel that is slipping or losing traction) when the slip of a wheel is greater than or equal to a wheel slip target. The condition detector 108 can receive a signal or indication from the traction control system 122 that indicates whether the traction control system 122 actively engaged in reducing a rotation rate of a wheel during a time interval, such as a first time interval. The condition detector 108 can determine the traction control system 122 is active if the traction control system 122 actively attempts to reduce the rate of rotation of a wheel of the vehicle at least once during the first time interval. If the condition detector 108 determines that the traction control system 122 was active at least once during the first time interval, then the condition detector 108 can determine that this condition is met, satisfied or present during the first time interval.

A fourth condition can include whether the motor torque exceeds a predetermined threshold, such as a motor torque threshold. The condition detector 108 can receive data from one or more sensors 124 or the attribute detector 104 in order to determine the motor torque for a motor of the vehicle. The vehicle can include one more motors, and the condition detector 108 can determine the motor torque for each motor. The condition detector 108 can determine the motor torque in newton-meters (Nm) or pound-feet (lb-ft), for example. The condition detector 108 can determine the motor torque using a sensor that can measure the torque being applied by the motor. For example, the sensor 124 can include a torque sensor, a rotary torque sensor, a torque cell. In some cases, the condition detector 108 can use a function to compute the motor torque based on the amount of current (amps) being supplied to the motor. For example, the motor torque for a motor can be based on a motor torque coefficient multiplied by the amount of current in amps being supplied to the motor.

The condition detector 108 can determine whether the motor torque equals or exceeds a predetermined threshold (e.g., a motor torque threshold stored in threshold 118 data structure). The predetermined threshold can be, for example, 1 Nm, 2, Nm, 5 Nm, 10 Nm, 15, Nm, 20 Nm, 25 Nm, 30 Nm, or other motor torque threshold that facilitates detecting and responding to driving on deformable surfaces. If the motor torque is greater than or equal to the predetermined threshold, then the condition detector can determine that the motor torque condition is met, satisfied, or present.

A fifth condition can include determining whether the cross-axle torque is less than or equal to a predetermined threshold, such as a cross-axle torque threshold stored in threshold 118 data structure. For example, a cross-axle torque can refer to a difference in torque between a left wheel on the left side of the vehicle and a right wheel on the right side of the vehicle and on the same axis. If the torque is greater on one side of the vehicle versus the other side of the vehicle, then the vehicle may be turning, such as turning around a corner. The cross-axle torque value can indicate a percentage or the difference in torque between one side of the axle and the other side of the axle. The cross-axle torque value can be an absolute number based on the difference between the torque on each side of the axle. The condition detector 108 can determine a value for the cross-axle torque, such as the difference between the torque between the left wheel and the right wheel of the vehicle, using data from one or more sensors 124 or the attribute detector 104. The value can be a percentage that indicates a percentage difference between the left wheel and right wheel torques. The value can be an absolute value of the difference in torque between the left and right wheel, and can be expressed in units such as Nm or ft-lb. The condition detector 108 can compare this value of the cross-axle torque with a threshold. If the cross-axle torque value is less than or equal to a cross-axle torque threshold, then the condition detector 108 can determine that the cross-axle torque condition is met, satisfied or present. If the condition detector 108 determines the cross-axle value as a percentage, then the cross-axle threshold can be 0%, 1%, 2%, 3%, 4%, 5% or other percentage that facilitate detecting and responding to driving on deformable surfaces. If the condition detector 108 determines the cross-axle torque as an absolute value that indicates the Nm or ft-lb difference between torque of a left and right wheel, then the cross-axle torque threshold can be 1 Nm, 2 Nm, 5 Nm, 7 Nm, 10 Nm, 15 Nm, or other cross-axle torque threshold that facilitates detecting and responding to driving on a deformable surface.

A sixth condition can include determining whether the wheel slip error (which can also be referred to as the wheel speed error) is below a predetermined threshold, such as a slip error threshold stored in threshold 118 data structure. The wheel slip error (or wheel speed error) can refer to the difference between the current wheel speed and the wheel speed target set by the traction control system 122. In some cases, the wheel slip error can be an absolute value, such as the wheel speed in rotations per minute or angular speed. In some cases, the wheel slip error can be a percentage based on the absolute difference of the wheel speed and the wheel speed target divided by the current wheel speed or divided by the wheel speed target.

A seventh condition can include determining whether the difference between the expected acceleration and the actual acceleration exceeds a predetermined threshold. The acceleration predictor 106 can determine the expected acceleration (e.g., based on an adaptive learning model 110). The acceleration predictor 106 can determine the expected acceleration for a time interval or responsive to an amount of actuation of an accelerator. The data processing system 102 can determine the actual acceleration of the vehicle based on a measurement from a sensor 124 or a determination based on data received from the sensor 124. The condition detector 108 can determine whether the difference between the expected acceleration and the actual acceleration is greater than a threshold 118. The threshold 118 can be an absolute value, a percentage, a ratio, or other value. For example, the condition detector 108 can determine whether the percentage the expected acceleration is greater than the current acceleration by a threshold such as 1%, 2%, 3%, 5%, 7%, 10%, 15% or other percentage. The percentage can be calculated as follows, for example: (expected_acceleration−actual_acceleration)/expected_acceleration. In an illustrative example, if the vehicle is traversing on a loose, deformable surface, the expected acceleration may be greater than the actual acceleration due to a loss or reduction in traction of the wheels on the deformable surface.

The data processing system 102 can include a slip target controller 112 designed, constructed and operational to modify, adjust, manage, or otherwise control a slip target used by the traction control system 122. The slip target controller 112 can determine to modify or change the slip target based on the one or more conditions detected by the condition detector 108. For example, if slip target controller 112 determines that a predetermined set of conditions are detected by the condition detector 108 for a first time interval, then the slip target controller 112 can determine to increase the slip target 120 by a predetermined amount for a second time interval that is subsequent to the first time interval. The predetermined set of conditions can include, for example: 1) a traction control system of the vehicle actively engaged to increase traction for the vehicle; and 2) a cross-axle torque being less than a second threshold. In some cases, the predetermined set of conditions can include, for example: 1) a traction control system of the vehicle actively engaged to increase traction for the vehicle, 2) a torque of a motor of the vehicle exceeding a second threshold, and 3) a wheel slip error below a third threshold. In some cases, the predetermined set of conditions can include, for example: 1) the actual acceleration of the vehicle greater than a second threshold, 2) a wheel slip error within a range, 3) a traction control system of the vehicle actively engaged to increase traction for the vehicle, 4) a torque of a motor of the vehicle exceeding a third threshold, and 5) a cross-axle torque being less than a fourth threshold.

The condition detector 108 can determine if the predetermined set of conditions are also present or detected during a third time interval that is subsequent to the second time interval. If the condition detector 108 determines that the predetermined set of conditions are true during the third time interval, the slip target controller 112 can determine to increase the slip target 120 again. For example, during the first time interval, the traction control system 122 can be configured with a default slip target 120. For the second time interval, the slip target controller 112 can increase the slip target from the default slip target to a second slip target. For the third time interval, and responsive to detection of the predetermined set of conditions by the condition detector 108, the slip target controller 112 can increase the second slip target to a third slip target that is greater than the second slip target. The slip target controller 112 can increase the slip target value until the slip target reaches a maximum slip target, such as a maximum slip target value stored in slip target data structure 120.

The amount of the increase can be the same from one time interval to the other, or vary. In some cases, the amount of each increase in the slip target from one time interval to the next can be the same. For example, the amount of increase in slip target can be based on a default or predetermined slip increment. The data processing system 102 can cause a torque applied by a motor to increase during a second time interval subsequent to the first time interval responsive to the increase from the first slip target to the second slip target, wherein a difference between the second slip target and the first slip target is set based on a default slip increment.

In some cases, the amount of the increase can vary based on a measurement or value of a condition. For example, if the difference between the expected acceleration and the actual acceleration in the second time interval is greater than a second, higher threshold, then the amount of the increase in the slip target from the second slip target in the second time interval to the third slip target in the third time interval can be greater than the amount of the increase from the default slip target in the first time interval to the second slip target in the second time interval. By increasing the amount of increase of the slip target based on the conditions or data thereof, the data processing system 102 can facilitate detection and response to driving on a deformable surface.

Upon detecting that at least one of the predetermined set of conditions are not present during a time interval, the slip target controller 112 can determine to not increase the slip target used by the traction control system 122. In some cases, the slip target controller 112 can determine, after increasing the slip target in a previous time interval, that if at least one of the predetermined set of conditions are not present during a subsequent time interval, to maintain the same slip target for yet another subsequent time interval. In some cases, the slip target controller 112 can determine to return the slip target to the default slip target responsive to determining that at least one of the predetermined set of conditions are not present or detected in the time interval. Thus, the slip target controller 112 can automatically detect and respond to driving on a deformable surface by increasing the slip target, as well as return the slip target to a default or initial slip target value responsive to automatically detecting that the vehicle is no longer driving on a deformable surface.

For example, the data processing system 102 can detect, for a second time interval subsequent to the first time interval and the increase of the first slip target to the second slip target, the condition indicating that the vehicle is traversing a deformable surface is present. The data processing system 102 can determine, for the second time interval, a second difference between a second expected acceleration of the vehicle and a second actual acceleration of the vehicle measured. The data processing system 102 can determine not to increase the second slip target based on the second difference less than the threshold.

In another example, the data processing system 102 can detect, for a second time interval subsequent to the first time interval and the increase of the first slip target to the second slip target, the condition is present. The data processing system 102 can determine, for the second time interval, a second difference between a second expected acceleration of the vehicle and a second actual acceleration of the vehicle measured. The data processing system 102 can determine to increase the second slip target to a third slip target based on the second difference greater than or equal to the threshold.

Figure 2:
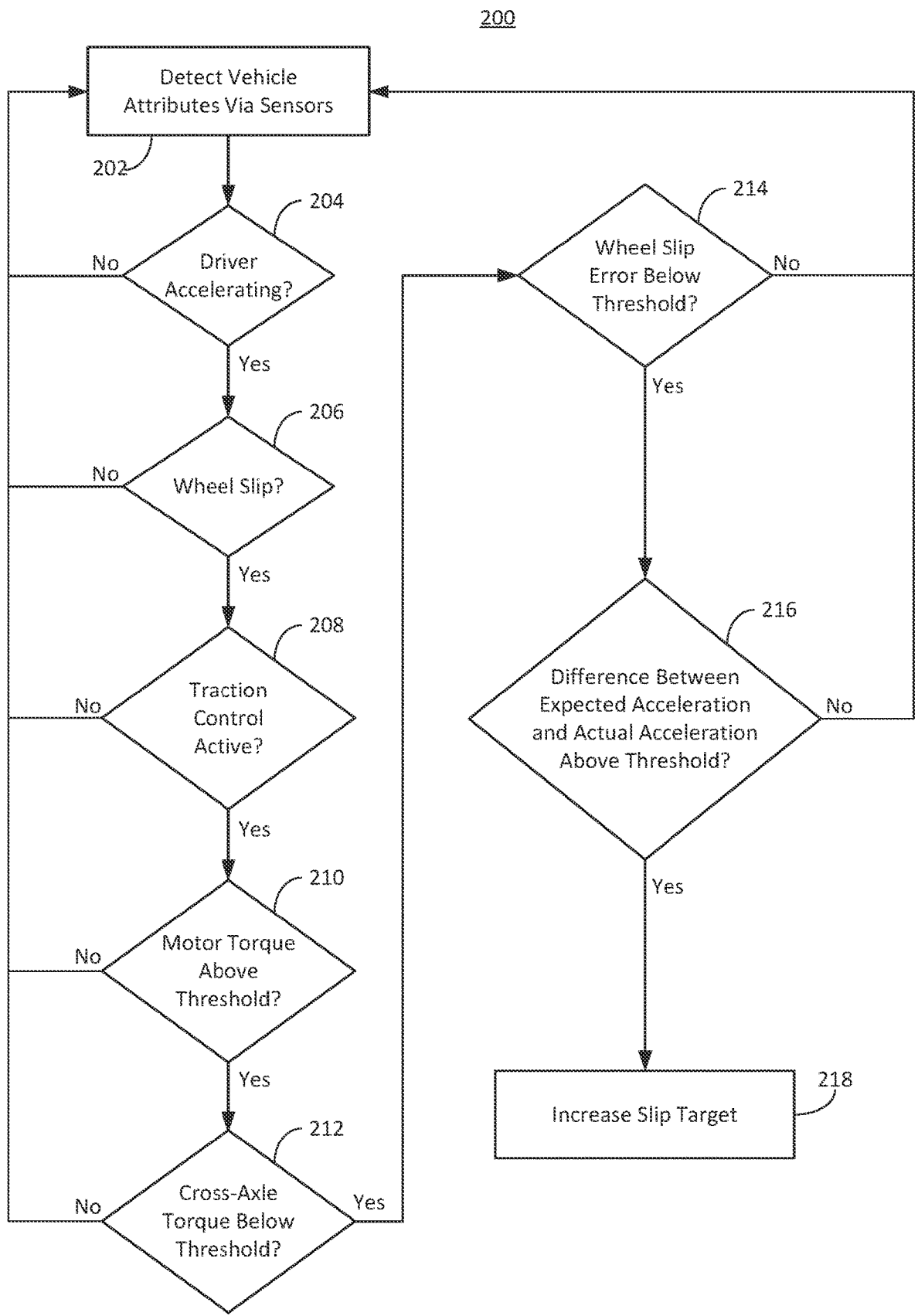
FIG. 2 depicts an example flow chart of a method for detecting and responding to driving on a deformable surface.

FIG. 2 depicts an example flow chart of a method for detecting and responding to driving on a deformable surface. The method 200 can be performed by one or more system or component depicted in FIG. 1, 5, or 6, including, for example a data processing system. At ACT 202, the data processing system can detect attributes of or associated with a vehicle via one or more sensors. For example, the data processing system can receive data based on at least one of the actual acceleration of the vehicle, an angular acceleration of a wheel of the vehicle, a torque applied by a motor of the vehicle, a speed of the vehicle, a steering angle of the vehicle, or a yaw rate of the vehicle. The data processing system can then proceed to evaluate the data. The data processing system can evaluate the data to determine whether one or more conditions are present or true. The data processing system can evaluate one or more decision blocks 204-216 sequentially, in parallel, or in any order or out of turn.

For example, at decision block 204, the data processing system can determine whether the driving is accelerating. If the data processing system (e.g., via condition detector) determines that the driver is accelerating at decision block 204, then the data processing system can proceed to decision block 206. If, on the other hand, the data processing system determines that the driver is not accelerating at decision block 204, then the data processing system can return to ACT 202 to detect or monitor vehicle attribute data via sensors.

The data processing system can proceed to decision block 206 to determine whether the vehicle is experiencing wheel slip. If the data processing system (e.g., via condition detector) determines that there is wheel slip, then the data processing system can proceed to decision block 208. If, however, the data processing system determines that there is no wheel slip at decision block 206, the data processing system can return to ACT 202 to continue monitor for vehicle attribute data.

The data processing system can proceed to decision block 208 to determine whether the traction control system of the vehicle is active. If the data processing system (e.g., via condition detector) determines that the traction control system is currently active, then the data processing system can proceed to decision block 210. If, however, the data processing system determines that the traction control system is not currently active, then the data processing system can return to ACT 202 to continue monitor for attribute data.

The data processing system can proceed to decision block 210 to determine whether the motor torque is above a threshold. If the data processing system determines (e.g., via condition detector) that the motor torque is greater than or equal to a threshold, then the data processing system can proceed to decision block 212. If, however, the data processing system determines that the motor torque is not greater than or equal to a threshold, then the data processing system can return to ACT 202 to continue monitoring for attribute data.

The data processing system can proceed to decision block 212 to determine whether the cross-axle torque is below a threshold. If the data processing system determines (e.g., via condition detector) that the cross-axle torque is below a threshold, then the data processing system can proceed to decision block 214. If, however, the data processing system determines that cross-axle torque is not below a threshold, then the data processing system can return to ACT 202 to continue monitoring for attribute data.

The data processing system can proceed to decision block 214 to determine whether the wheel slip error is below a threshold. If the data processing system determines (e.g., via condition detector) that the wheel slip error is below a threshold, then the data processing system can proceed to decision block 216. If, however, the data processing system determines that the wheel slip error is not below a threshold, then the data processing system can return to ACT 202 to continue monitoring for attribute data.

The data processing system can proceed to decision block 216 to determine whether the difference between the expected acceleration and the actual acceleration of the vehicle is greater than a threshold. If the data processing system (e.g., via condition detector) determines that the difference between the expected acceleration and the actual acceleration of the vehicle is greater than a threshold, then the data processing system can proceed to ACT 218. If, however, the data processing system determines that the difference between the expected acceleration and the actual acceleration of the vehicle is not greater than a threshold, then the data processing system can return to ACT 202 to continue to monitor attribute data.

The method can include the data processing system increasing the slip target at ACT 218. The data processing system can determine to increase the slip target at ACT 218 responsive to some or all of the decisions out of decision blocks 204, 206, 208, 210, 212, 214 and 216 being affirmative, or "yes" or otherwise present. The data processing system can increase the slip target by a predetermined amount. The data processing system can provide the new, or increased slip target to a traction control system to cause the traction control system to use an increased slip target for a subsequent time interval.

Figure 3:
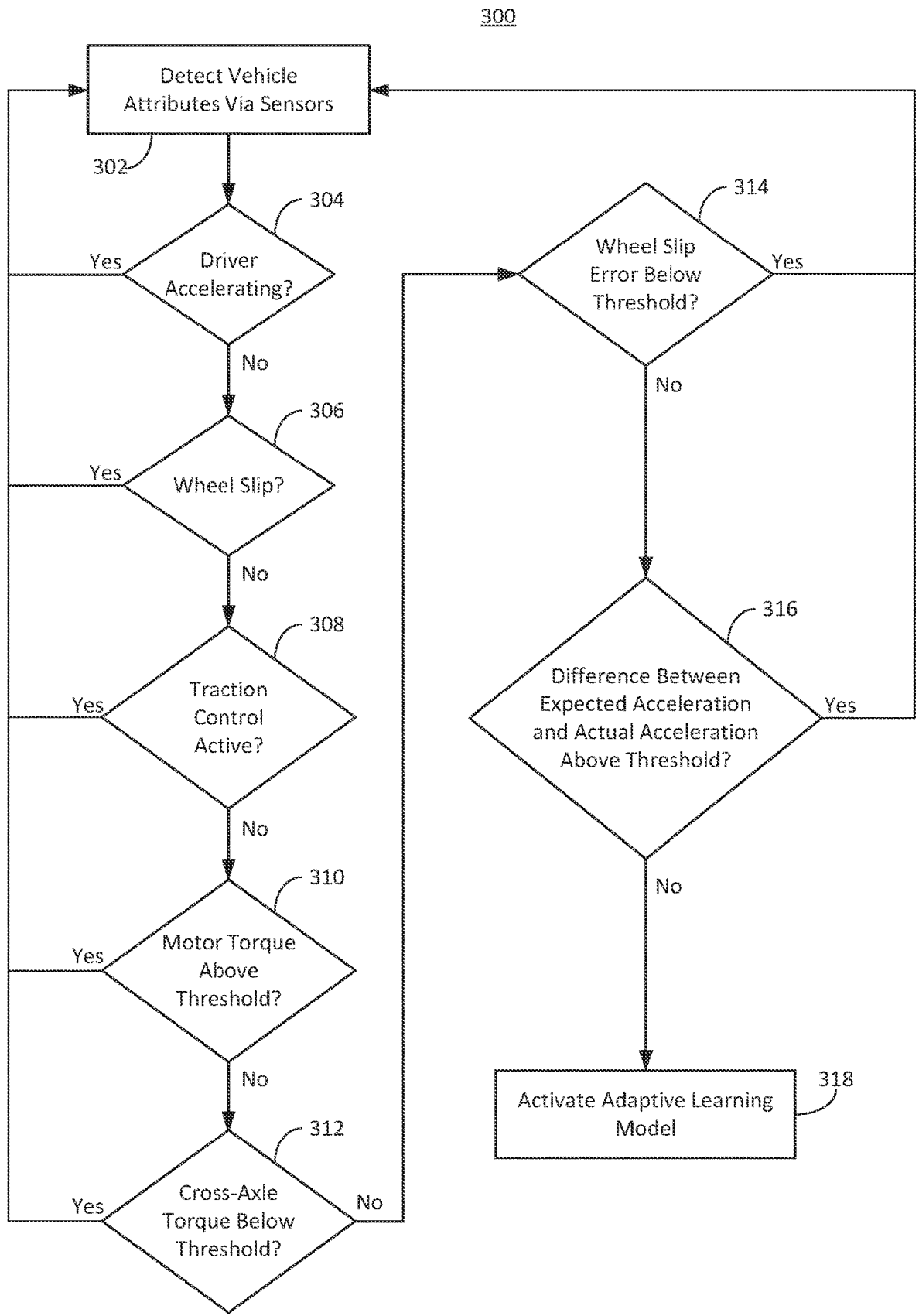
FIG. 3 depicts an example flow chart of a method for detecting and responding to driving on a deformable surface.

FIG. 3 depicts an example flow chart of a method for detecting and responding to driving on a deformable surface. The method 300 can be performed by one or more system or component depicted in FIG. 1, 5 or 5, including, for example, a data processing system. The data processing system can use the method 300 to determine whether the circumstances allow activing an adaptive learning model to update a model used by the data processing system to predict an expected acceleration of the vehicle based on an amount of torque being applied by one or more motors of the vehicle. For example, the data processing system can determine when the driving conditions are satisfactory to update the model such that the model can accurately and reliably generate an expected acceleration value. Such desired or optimal driving conditions can include the vehicle driving on a non-deformable surface, such as a paved road or highway. By calibrating or updating the model using an adaptive learning technique during desired driving conditions, the data processing system can use the modified model to generate a more accurate and reliable expected acceleration to be used to determine whether to increase the slip target, as depicted, for example, in method 200 of FIG. 2.

To determine whether to activate the adaptive learning technique to update the model used by the acceleration predictor to generate an expected acceleration for the vehicle, the data processing system can detect vehicle attributes via sensors at ACT 302. The data processing system can receive attribute data based on at least one of the actual acceleration of the vehicle, an angular acceleration of a wheel of the vehicle, a torque applied by a motor of the vehicle, a speed of the vehicle, a steering angle of the vehicle, or a yaw rate of the vehicle. The data processing system can then proceed to evaluate the data. The data processing system can evaluate the data to determine whether one or more conditions are not present or are false. The data processing system can evaluate one or more decision blocks 304-316 sequentially, in parallel, or in any order or out of turn.

For example, at decision block 304, the data processing system can determine whether the driving is not accelerating. If the data processing system (e.g., via condition detector) determines that the driver is not accelerating at decision block 304, then the data processing system can proceed to decision block 306. If, on the other hand, the data processing system determines that the driver is accelerating at decision block 304, then the data processing system can return to ACT 302 to continue detecting or monitoring vehicle attribute data via sensors without initiating an adaptive learning technique to update the model used by the acceleration predictor to determine the expected acceleration.

The data processing system can proceed to decision block 306 to determine whether the vehicle is not experiencing wheel slip. If the data processing system (e.g., via condition detector) determines that there is no wheel slip, then the data processing system can proceed to decision block 308. If, however, the data processing system determines that there is wheel slip at decision block 306, the data processing system can return to ACT 302 to continue detecting or monitoring vehicle attribute data via sensors without initiating an adaptive learning technique to update the model used by the acceleration predictor to determine the expected acceleration.

The data processing system can proceed to decision block 308 to determine whether the traction control system of the vehicle is not active. If the data processing system (e.g., via condition detector) determines that the traction control system is not currently active, then the data processing system can proceed to decision block 310. If, however, the data processing system determines that the traction control system is currently active, then the data processing system can return to ACT 302 to continue detecting or monitoring vehicle attribute data via sensors without initiating an adaptive learning technique to update the model used by the acceleration predictor to determine the expected acceleration.

The data processing system can proceed to decision block 310 to determine whether the motor torque is not above a threshold. If the data processing system determines (e.g., via condition detector) that the motor torque is not greater than or equal to a threshold, then the data processing system can proceed to decision block 312. If, however, the data processing system determines that the motor torque is greater than or equal to a threshold, then the data processing system can return to ACT 302 to continue detecting or monitoring vehicle attribute data via sensors without initiating an adaptive learning technique to update the model used by the acceleration predictor to determine the expected acceleration.

The data processing system can proceed to decision block 312 to determine whether the cross-axle torque is not below a threshold. If the data processing system determines (e.g., via condition detector) that the cross-axle torque is not below a threshold, then the data processing system can proceed to decision block 314. If, however, the data processing system determines that cross-axle torque is below a threshold, then the data processing system can return to ACT 302 to continue detecting or monitoring vehicle attribute data via sensors without initiating an adaptive learning technique to update the model used by the acceleration predictor to determine the expected acceleration.

The data processing system can proceed to decision block 314 to determine whether the wheel slip error is not below a threshold. If the data processing system determines (e.g., via condition detector) that the wheel slip error is not below a threshold, then the data processing system can proceed to decision block 316. If, however, the data processing system determines that the wheel slip error is below a threshold, then the data processing system can return to ACT 302 to continue detecting or monitoring vehicle attribute data via sensors without initiating an adaptive learning technique to update the model used by the acceleration predictor to determine the expected acceleration.

The data processing system can proceed to decision block 316 to determine whether the difference between the expected acceleration and the actual acceleration of the vehicle is not greater than a threshold. If the data processing system (e.g., via condition detector) determines that the difference between the expected acceleration and the actual acceleration of the vehicle is not greater than a threshold, then the data processing system can proceed to ACT 318. If, however, the data processing system determines that the difference between the expected acceleration and the actual acceleration of the vehicle is greater than a threshold, then the data processing system can return to ACT 302 to continue detecting or monitoring vehicle attribute data via sensors without initiating an adaptive learning technique to update the model used by the acceleration predictor to determine the expected acceleration.

The method 300 can include the data processing system initiating, activating, or performing an adaptive learning technique to update a model used by the acceleration predictor to determine the expected acceleration at ACT 318 responsive to some or all of the decisions out of decision blocks 304, 306, 308, 310, 312, 314 and 316 being negative, or "no" or otherwise not present. The data processing system can perform the adaptive learning technique for a time interval, or until any one of the conditions or outputs of decision blocks 304-316 become positive or "yes".

Figure 4:
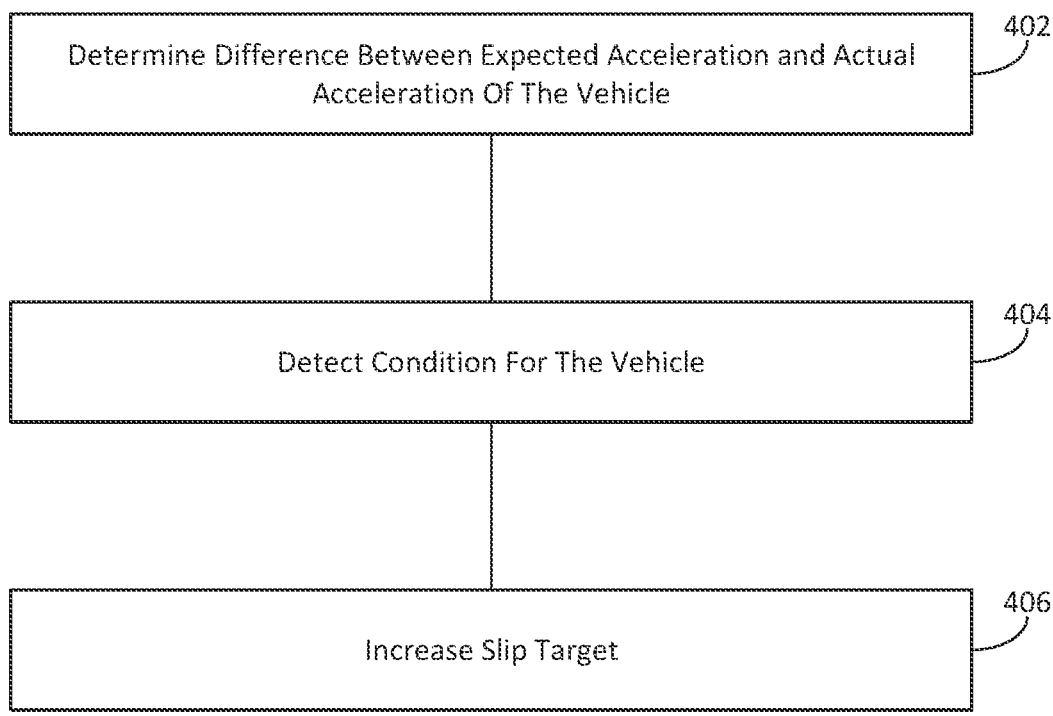
FIG. 4 depicts an example flow chart of a method for detecting and responding to driving on a deformable surface.

FIG. 4 depicts an example flow chart of a method for detecting and responding to driving on a deformable surface. The method 400 can be performed by one or more system or component depicted in FIG. 1, 5 or 6, including, for example, a data processing system. At ACT 402, the data processing system can determine the difference between an expected acceleration and an actual acceleration of the vehicle during a first time interval. For example, the data processing system can determine, for a first time interval, a difference between the expected acceleration of the vehicle and the actual acceleration of the vehicle measured via one or more sensors of the vehicle. The data processing system can determine, via a model, the expected acceleration for the vehicle responsive to an amount of force applied via a motor of the vehicle.

At ACT 404, the data processing system can detect a condition for the vehicle during the first time interval. The data processing system can detect, for the first time interval, the condition for the vehicle to increase a first slip target set for the vehicle. For example, the data processing system can detect the condition for the vehicle based on a traction control system of the vehicle being active. The data processing system can detect the condition for the vehicle based on: 1) the actual acceleration of the vehicle greater than a second threshold, 2) a wheel slip error within a range, 3) a traction control system of the vehicle actively engaged to increase traction for the vehicle, 4) a torque of a motor of the vehicle exceeding a third threshold, and 5) a cross-axle torque being less than a fourth threshold. In some cases, the data processing system can determine the condition is present if: 1) the vehicle accelerating more than a predetermined threshold, 2) the wheel slip greater than a predetermined threshold, 3) the traction control is enabled and currently active, 4) the motor torque exceeds a predetermined threshold, 5) the cross-axle torque is below a predetermined threshold, 6) the wheel slip error is below a predetermined threshold, and 7) the difference between the expected acceleration and the actual acceleration exceeds a predetermined threshold. The condition being present can indicate that the vehicle is traversing on a deformable surface during the first time interval and the data processing system is to increase the slip target for a subsequent time interval. In some cases, the data processing system can provide an alert, alarm, notification, or other indication that indicates that the condition is present and that the slip target is to be increased. For example, the data processing system can provide a visual or auditory notification via a graphical user interface or other output interface of the vehicle.

At ACT 406, the data processing system can increase the slip target. For example, during the first time interval, the slip target can be a first slip target. If the data processing system detects that the condition is present during the first time interval, the data processing system can increase the first slip target set for the vehicle to a second slip target responsive to the difference greater than or equal to a threshold and the detection of the condition. The data processing system can increase the slip target from the first slip target value to a second slip target value that is greater than the first slip target value. The data processing system can increase the slip target by a default or predetermined increment, such as a percentage or absolute amount.

Figure 5:
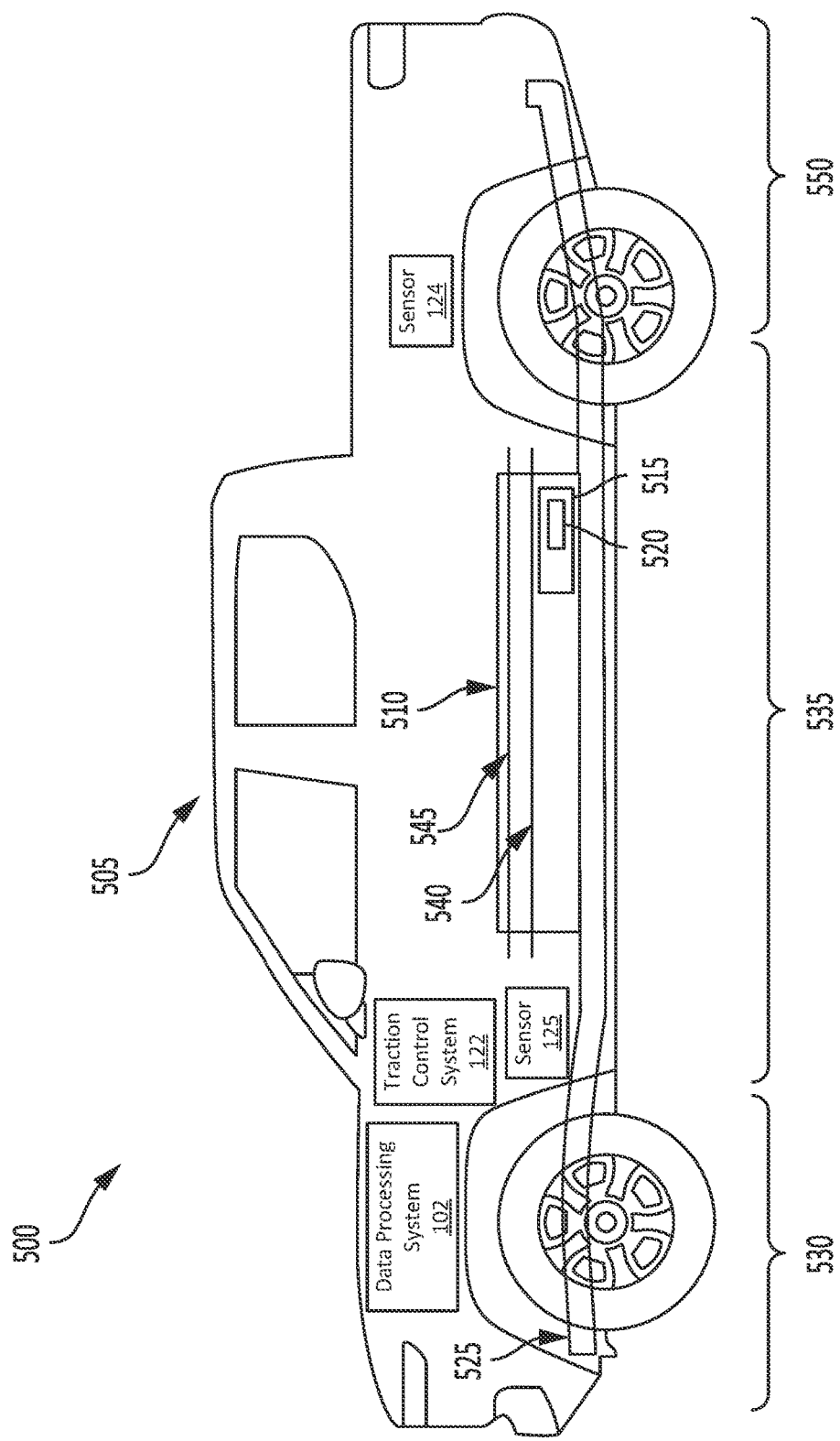
FIG. 5 depicts an electric vehicle with a system to detect and respond to driving on a deformable surface.

FIG. 5 depicts an example cross-sectional view 500 of an electric vehicle 505 installed with at least one battery pack 510. Electric vehicles 505 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 510 can also be used as an energy storage system to power a building, such as a residential home or commercial building. Electric vehicles 505 can be fully electric or partially electric (e.g., plug-in hybrid) and further, electric vehicles 505 can be fully autonomous, partially autonomous, or unmanned. Electric vehicles 505 can also be human operated or non-autonomous. Electric vehicles 505 such as electric trucks or automobiles can include on-board battery packs 510, batteries 515 or battery modules 515, or battery cells 520 to power the electric vehicles. The electric vehicle 505 can include a chassis 525 (e.g., a frame, internal frame, or support structure). The chassis 525 can support various components of the electric vehicle 505. The chassis 525 can span a front portion 530

(e.g., a hood or bonnet portion), a body portion 535, and a rear portion 540 (e.g., a trunk, payload, or boot portion) of the electric vehicle 505. The battery pack 510 can be installed or placed within the electric vehicle 505. For example, the battery pack 510 can be installed on the chassis 525 of the electric vehicle 505 within one or more of the front portion 530, the body portion 535, or the rear portion 540. The battery pack 510 can include or connect with at least one busbar, e.g., a current collector element. For example, the first busbar 545 and the second busbar 550 can include electrically conductive material to connect or otherwise electrically couple the battery 515, the battery modules 515, or the battery cells 520 with other electrical components of the electric vehicle 505 to provide electrical power to various systems or components of the electric vehicle 505.

Figure 6:
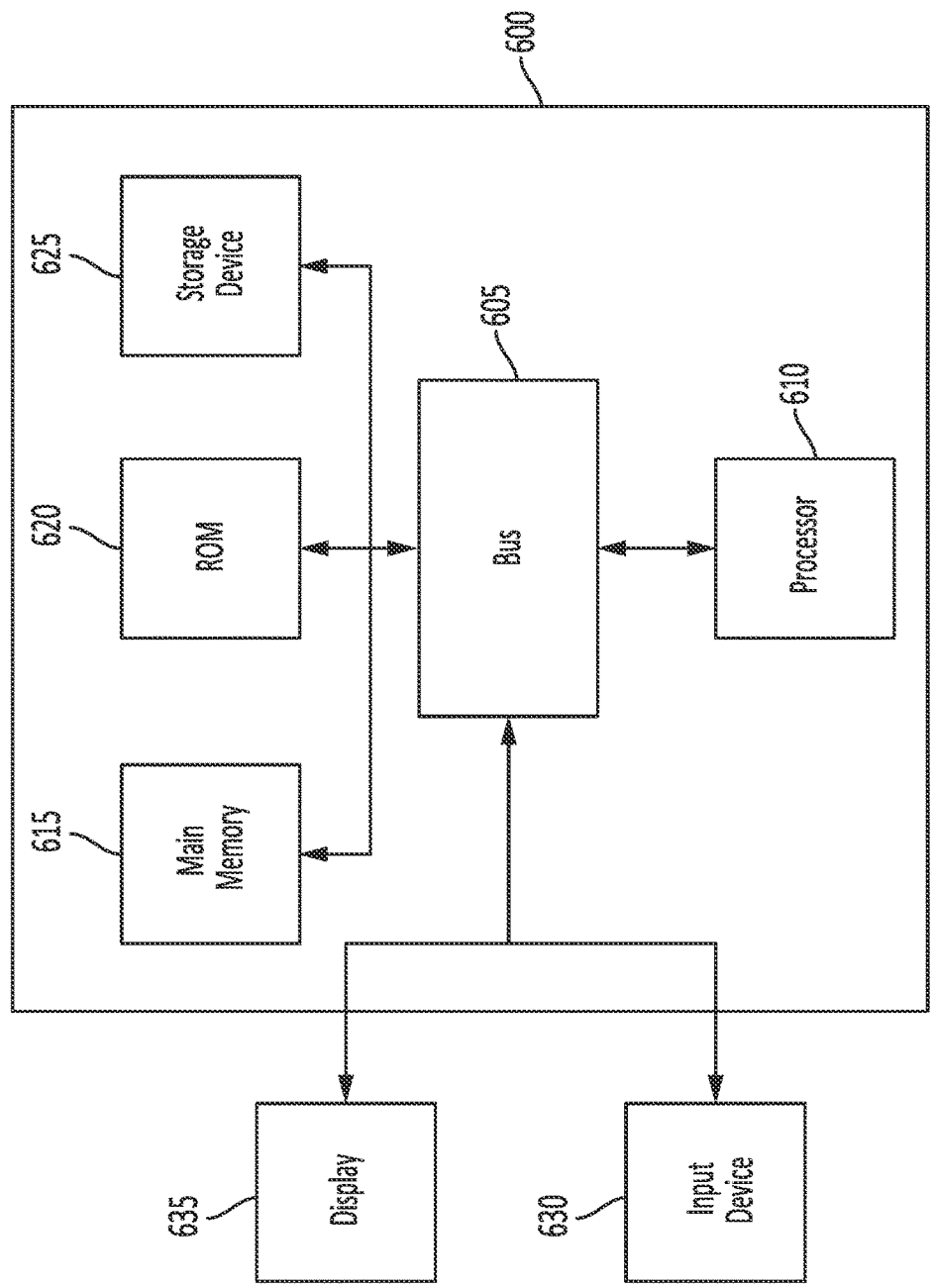
FIG. 6 is a block diagram illustrating an architecture for a computer system that can be employed to implement elements of the systems and methods described and illustrated herein, including aspects of the systems depicted in FIG. 1 and FIG. 5, and the methods depicted in FIG. 2, FIG. 3, and FIG. 4.

FIG. 6 depicts an example block diagram of an example computer system 600. The computer system or computing device 600 can include or be used to implement a data processing system or its components. The computing system 600 includes at least one bus 605 or other communication component for communicating information and at least one processor 610 or processing circuit coupled to the bus 605 for processing information. The computing system 600 can also include one or more processors 610 or processing circuits coupled to the bus for processing information. The computing system 600 also includes at least one main memory 615, such as a random access memory (RAM) or other dynamic storage device, coupled to the bus 605 for storing information, and instructions to be executed by the processor 610. The main memory 615 can be used for storing information during execution of instructions by the processor 610. The computing system 600 may further include at least one read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions.

The computing system 600 may be coupled via the bus 605 to a display 635, such as a liquid crystal display, or active matrix display, for displaying information to a user such as a driver of the electric vehicle 505 or other end user. An input device 630, such as a keyboard or voice interface may be coupled to the bus 605 for communicating information and commands to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" May be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
   one or more processors coupled with memory to:
   determine, for a first time interval, a difference between an expected acceleration of a vehicle and an actual acceleration of the vehicle measured via one or more sensors of the vehicle;
   detect, for the first time interval, a condition for the vehicle to increase a first slip target set for the vehicle;
   increase the first slip target set for the vehicle to a second slip target responsive to the difference greater than or equal to a threshold and the detection of the condition; and
   generate a control signal to cause a motor to increase a torque applied during a second time interval subsequent to the first time interval, responsive to the increase from the first slip target to the second slip target.

2. The system of claim 1, comprising:
   the one or more processors to determine, via a model, the expected acceleration for the vehicle responsive to an amount of force applied via the motor of the vehicle.

3. The system of claim 1, comprising the one or more processors to:
   detect, during a third time interval, that the condition for the vehicle is not present and a speed of the vehicle is greater than a second threshold;
   update a model via an adaptive learning technique responsive to the detection that the condition for the vehicle is not present and the speed of the vehicle is greater than the second threshold; and
   determine the expected acceleration for the vehicle via the model updated via the adaptive learning technique.

4. The system of claim 1, comprising the one or more processors to:
   receive data via the one or more sensors of the vehicle, the data based on at least one of the actual acceleration of the vehicle, an angular acceleration of a wheel of the vehicle, the torque applied by the motor of the vehicle, a speed of the vehicle, a steering angle of the vehicle, or a yaw rate of the vehicle; and
   detect the condition based on one or more comparisons of the data with one or more thresholds.

5. The system of claim 1, comprising:
   the one or more processors to detect the condition for the vehicle based on a traction control system of the vehicle being active.

6. The system of claim 1, comprising:
   the one or more processors to detect the condition for the vehicle based on a cross-axle torque being less than a second threshold.

7. The system of claim 1, comprising:
   the one or more processors to detect the condition for the vehicle based on:
   a traction control system of the vehicle actively engaged to increase traction for the vehicle; and
   a cross-axle torque being less than a second threshold,
   wherein the condition corresponds to traversal by the vehicle on a deformable surface.

8. The system of claim 1, comprising:
   the one or more processors to detect the condition for the vehicle based on:
   a traction control system of the vehicle actively engaged to increase traction for the vehicle;
   the torque of the motor of the vehicle exceeding a second threshold; and
   a wheel slip error below a third threshold.

9. The system of claim 1, comprising:
   the one or more processors to detect the condition for the vehicle based on:
   the actual acceleration of the vehicle greater than a second threshold;
   a wheel slip error within a range;
   a traction control system of the vehicle actively engaged to increase traction for the vehicle;
   the torque of the motor of the vehicle exceeding a third threshold; and
   a cross-axle torque being less than a fourth threshold.

10. The system of claim 1, comprising the one or more processors to:
    detect, for a third time interval subsequent to the first time interval and the increase of the first slip target to the second slip target, the condition is present;
    determine, for the third time interval, a second difference between a second expected acceleration of the vehicle and a second actual acceleration of the vehicle measured; and
    determine not to increase the second slip target based on the second difference less than the threshold.

11. The system of claim 1, comprising the one or more processors to:
    detect, for a third time interval subsequent to the first time interval and the increase of the first slip target to the second slip target, the condition is present;

determine, for the third time interval, a second difference between a second expected acceleration of the vehicle and a second actual acceleration of the vehicle measured; and determine to increase the second slip target to a third slip target based on the second difference greater than or equal to the threshold.

12. The system of claim 1, wherein:

a difference between the second slip target and the first slip target is set based on a default slip increment.

13. A method, comprising:

determining, by one or more processors coupled with memory of a vehicle, for a first time interval, a difference between an expected acceleration of the vehicle and an actual acceleration of the vehicle measured via one or more sensors of the vehicle;

detecting, by the one or more processors for the first time interval, a condition for the vehicle to increase a first slip target set for the vehicle;

increasing, by the one or more processors, the first slip target set for the vehicle to a second slip target responsive to the difference greater than or equal to a threshold and the detection of the condition; and generating a control signal to cause a motor to increase a torque applied during a second time interval subsequent to the first time interval, responsive to the increase from the first slip target to the second slip target.

14. The method of claim 13, comprising:

determining, by the one or more processors via a model, the expected acceleration for the vehicle responsive to an amount of force applied via the motor of the vehicle.

15. The method of claim 13, comprising:

detecting, by the one or more processors during a third time interval, that the condition for the vehicle is not present and a speed of the vehicle is greater than a second threshold;

updating, by the one or more processors, a model via an adaptive learning technique responsive to the detection that the condition for the vehicle is not present and the speed of the vehicle is greater than the second threshold; and determining, by the one or more processors, the expected acceleration for the vehicle via the model updated via the adaptive learning technique.

16. The method of claim 13, comprising:

receiving, by the one or more processors, data via the one or more sensors of the vehicle, the data based on at least one of the actual acceleration of the vehicle, an angular acceleration of a wheel of the vehicle, the torque applied by the motor of the vehicle, a speed of the vehicle, a steering angle of the vehicle, or a yaw rate of the vehicle; and detecting, by the one or more processors, the condition based on one or more comparisons of the data with one or more thresholds.

17. The method of claim 13, comprising:

detecting, by the one or more processors, the condition for the vehicle based on a traction control system of the vehicle being active.

18. The method of claim 13, comprising:

detecting, by the one or more processors, the condition for the vehicle based on:

the actual acceleration of the vehicle greater than a second threshold;

a wheel slip error within a range;

a traction control system of the vehicle actively engaged to increase traction for the vehicle;

the torque of the motor of the vehicle exceeding a third threshold; and a cross-axle torque being less than a fourth threshold.

19. A vehicle, comprising:

a plurality of wheels;

one or more motors configured to rotate the plurality of wheels; and one or more processors coupled with memory to:

determine, for a first time interval, a difference between an expected acceleration of the vehicle and an actual acceleration of the vehicle measured via one or more sensors of the vehicle;

detect, for the first time interval, a condition for the vehicle to increase a first slip target set for the vehicle;

increase the first slip target set for the vehicle to a second slip target responsive to the difference greater than or equal to a threshold and the detection of the condition; and generate a control signal to cause a motor to increase a torque applied during a second time interval subsequent to the first time interval, responsive to the increase from the first slip target to the second slip target.

20. The vehicle of claim 19, comprising:

the one or more processors to determine, via a model, the expected acceleration for the vehicle responsive to an amount of force applied via the motor of the vehicle.

* * * * *